United States Patent
Chen et al.

(10) Patent No.: US 10,009,167 B2
(45) Date of Patent: Jun. 26, 2018

(54) CARRIER SYNCHRONIZATION DEVICE

(71) Applicant: TAIWAN SEMICONDUCTOR MANUFACTURING CO., LTD., Hsinchu (TW)

(72) Inventors: Huan-Neng Chen, Taichung (TW); William Wu Shen, Hsinchu (TW); Lan-Chou Cho, Hsinchu (TW); Feng-Wei Kuo, Hsinchu County (TW); Chewn-Pu Jou, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 76 days.

(21) Appl. No.: 14/938,356

(22) Filed: Nov. 11, 2015

(65) Prior Publication Data
US 2017/0134155 A1    May 11, 2017

(51) Int. Cl.
| | | |
|---|---|---|
| H04L 7/033 | (2006.01) | |
| H04L 7/00 | (2006.01) | |
| H04L 7/04 | (2006.01) | |
| H04L 27/00 | (2006.01) | |

(52) U.S. Cl.
CPC .......... *H04L 7/0331* (2013.01); *H04L 7/0041* (2013.01); *H04L 7/042* (2013.01); *H04L 27/00* (2013.01)

(58) Field of Classification Search
CPC ...... H04L 7/0331; H04L 7/0041; H04L 7/042
See application file for complete search history.

(56) References Cited

U.S. PATENT DOCUMENTS

| | | | | |
|---|---|---|---|---|
| 5,347,228 A * | 9/1994 | Iwasaki | ............... | H04L 27/2273 329/308 |
| 5,438,589 A * | 8/1995 | Nakamura | ............. | H04B 1/707 375/141 |
| 7,564,929 B2 * | 7/2009 | Lopez Villegas | ... | H04L 27/2276 329/304 |
| 7,956,694 B1 * | 6/2011 | Wilson | ...................... | H03L 7/08 315/194 |
| 2009/0258657 A1 * | 10/2009 | Tanaka | .................... | H03J 1/005 455/456.1 |

FOREIGN PATENT DOCUMENTS

GB    2314981 A    * 1/1998    ......... H04L 27/2273

OTHER PUBLICATIONS

Ziheng Yang et al., "Design and Implementation of the Digital Costas Loop Based on Software Defined Radio", IEEE, 2011.
J. P. Costas, "Synchronous Communications" (Dec. 1956 Proceedings of the IRE), 1956.
Shih-Jou Huang et al., "W-Band BPSK and QPSK Transceivers With Costas-Loop Carrier Recovery in 65-nm CMOS Technology", IEEE Journal of Solid-State Circuits, vol. 46, No. 12, Dec. 2011.

* cited by examiner

*Primary Examiner* — Freshteh N Aghdam
(74) *Attorney, Agent, or Firm* — Maschoff Brennan

(57) ABSTRACT

A device, a circuit and a method are disclosed herein. The device includes a data receiving circuit and an oscillating signal generator. The data receiving circuit is configured to output a first output signal, a second output signal, and a phase error signal according to an oscillating signal and a modulated signal, in which the phase error signal indicates a phase difference between the oscillating signal and the modulated signal. The oscillating signal generator is configured to delay a phase of a first reference signal according to the phase error signal, to generate the oscillating signal.

20 Claims, 7 Drawing Sheets

CARRIER SYNCHRONIZATION DEVICE

BACKGROUND

In a communication carrier system, a baseband signal is modulated with a carrier wave, and information in the baseband signal is extracted from the modulated wave received by the receiver. During the transmission progress, random offsets or noises are introduced to the carrier wave. As a result, the frequency of the carrier wave received by the transmitter and that received by the receiver are different from each other. If the difference between the carrier wave at the transmitter and that at the receiver is too large, such extraction is failed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
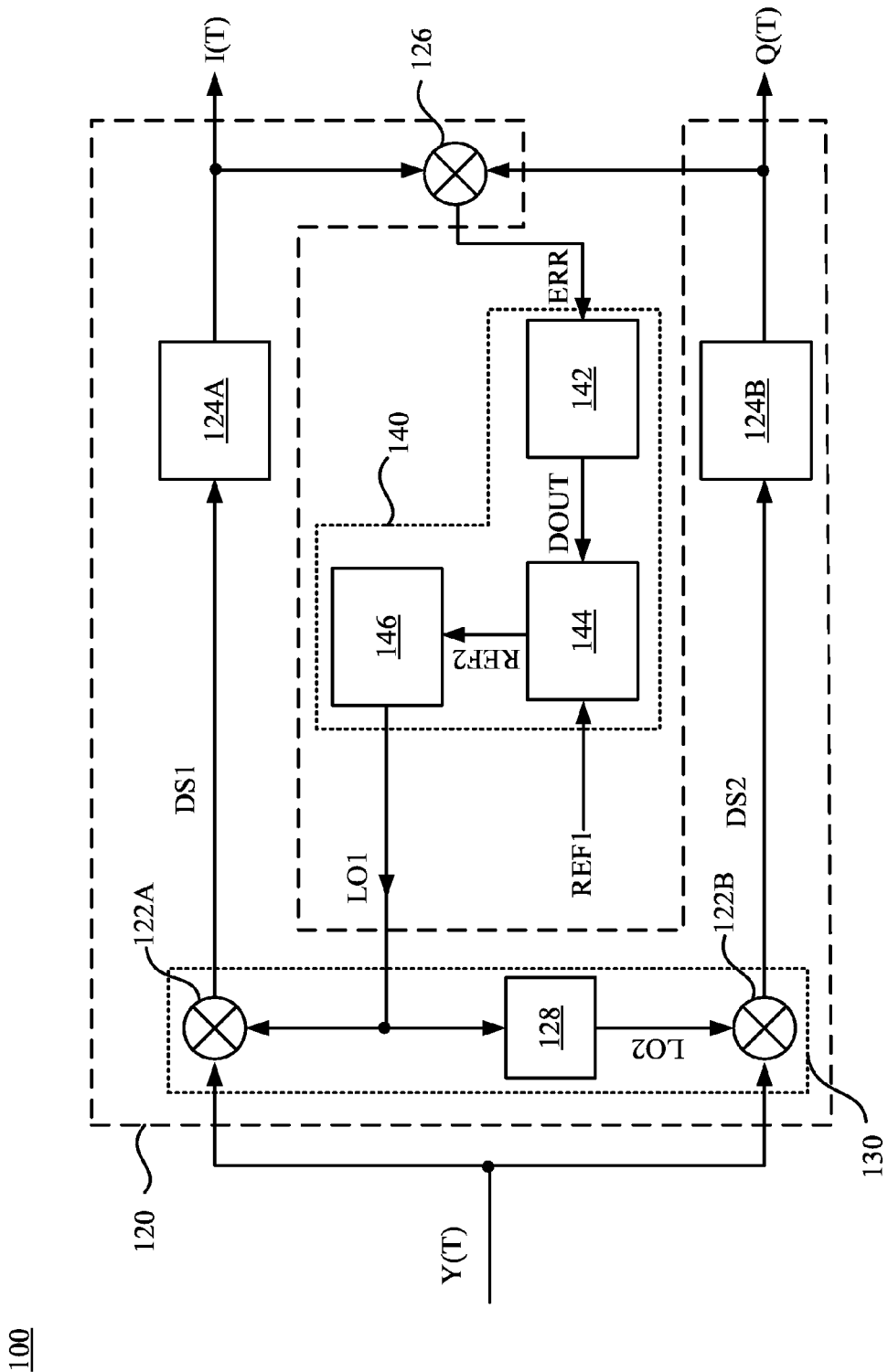
FIG. 1 is a schematic diagram of a device in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In this document, the term "coupled" may also be termed as "electrically coupled", and the term "connected" may be termed as "electrically connected". "Coupled" and "connected" may also be used to indicate that two or more elements cooperate or interact with each other.

FIG. 1 is a schematic diagram of a device 100 in accordance with various embodiments of the present disclosure. In some embodiments, the device 100 is implemented in or implemented as a demodulation device.

In some embodiments, the device 100 is configured to generate a local oscillating signal LO1, and demodulate a modulated signal Y(T) according to the local oscillating signal LO1, in order to output an output signal I(T) and an output signal Q(T). In some embodiments, the device 100 is applied to a receiver or a transceiver. In some embodiments, the device 100 is configured to estimate the frequency and phase variations between a transmitter (not shown) and the receiver by using information in the received modulated signal Y(T) to reproduce or recover the carrier signal for the modulated signal Y(T) at the receiver, in order to permit coherent demodulation. In further embodiments, the transceiver is a radio frequency interconnect (RFI) transceiver.

As illustratively shown in FIG. 1, the device 100 includes a data receiving circuit 120 and an oscillating signal generator 140. In some embodiments, the device 100 is applied to transceivers employing Binary Phase Shift Keying (BPSK) modulation.

In various embodiments, the data receiving circuit 120 operates as a demodulator of the device 100. The data receiving circuit 120 is configured to output the output signal I(T), the output signal Q(T), and a phase error signal ERR according to the oscillating signal LO1 and the modulated signal Y(T). In some embodiments, the phase error signal ERR indicates a phase difference between the oscillating signal LO1 and the modulated signal Y(T). The oscillating signal generator 140 is configured to delay a phase of a reference signal REF1 according to the phase error signal ERR, in order to generate the oscillating signal LO1. In some embodiments, the oscillating signal generator 140 includes an analog to digital converter 142, a digital to time converter 144, and a phase-locked loop 146. An input terminal of the analog to digital converter 142 is electrically coupled to the data receiving circuit 120 to receive the phase error signal ERR. An input terminal of the digital to time converter 144 is electrically coupled to an output terminal of the analog to digital converter 142 to receive a digital signal DOUT. An input terminal of the phase-locked loop 146 is electrically coupled to an output terminal of the digital to time converter 144 to receive a reference signal REF2. The analog to digital converter 142 is configured to receive the phase error signal ERR and convert the phase error signal ERR to the digital signal DOUT. The digital to time converter 144 is configured to delay the reference signal REF1 according to the digital signal DOUT, in order to generate the reference signal REF2. The phase-locked loop 146 is configured to generate the oscillating signal LO1 according to the reference signal REF2.

In some embodiments, as illustratively shown in FIG. 1, the data receiving circuit 120 includes a demodulator 130, filters 124A and 124B, and a mixer 126. The demodulator 130 is configured to demodulate the modulated signal Y(T) according to the oscillating signal LO1. In some embodiments, the demodulator 130 includes mixers 122A and 122B, and a phase shifter 128. A first input terminal of the mixer 122A and a first input terminal of the mixer 122B are configured to receive the modulated signal Y(T). A second input terminal of the mixer 122A is electrically coupled to an output terminal of the phase-locked loop 146 to receive the oscillating signal LO1. A second input terminal of the mixer 122B is electrically coupled to an output terminal of the phase shifter 128 to receive a shifted oscillating signal LO2. An input terminal of the filter 124A is electrically coupled to an output terminal of the mixer 122A to receive a data signal DS1. An input terminal of the filter 124B is electrically coupled to an output terminal of the mixer 122B to receive a data signal DS2. A first input terminal and a second input terminal of the mixer 126 are electrically coupled to an output terminal of the filter 124A and an output terminal of the filter 124B respectively to receive the output signal I(T) and the output signal Q(T). An output terminal of the mixer 126 is electrically coupled to the input terminal of the analog to digital converter 142. An input terminal of the phase shifter 128 is electrically coupled to the output terminal of the phase-locked loop 146 to receive the oscillating signal LO1.

The mixer 122A is configured to demodulate the modulated signal Y(T) according to the oscillating signal LO1, in order to generate the data signal DS1. The mixer 122B is configured to demodulate the modulated signal Y(T) according to the shifted oscillating signal LO2, in order to generate the data signal DS2.

In some embodiments, the oscillating signal LO1 and the shifted oscillating signal LO2 are different in phase by about 90 degrees. The phase shifter 128 is configured to receive the oscillating signal LO1 and generate the shifted oscillating signal LO2 according to the oscillating signal LO1. Alternatively stated, in some embodiments, a phase shift of about 90 degrees is introduced to the oscillating signal LO1 by the phase shifter 128, to generate the shifted oscillating signal LO2.

The filter 124A is configured to generate the output signal I(T) according to the data signal DS1. The filter 124B is configured to generate the output signal Q(T) according to the data signal DS2. The mixer 126 is configured to generate the phase error signal ERR according to the output signal I(T) and the output signal Q(T). The phase error signal ERR indicates the phase difference between the oscillating signal LO1 and the modulated signal Y(T). In some embodiments, since the oscillating signal LO1 and the shifted oscillating signal LO2 are different in phase by about 90 degrees, the phase error signal ERR also indicates the phase difference between the shifted oscillating signal LO2 and the modulated signal Y(T). In some embodiments, the mixer 126 operates as a phase detector of the device 100.

In some approaches without using the oscillating signal generator 140, a phase offset is randomly introduced to the modulated signal Y(T) during the transmission progress. As a result, the output signals I(T) and Q(T) are different from the data carried in the modulated signal Y(T). Compared with the aforementioned approaches, the device 100 utilizes the analog to digital converter 142 to convert the phase error signal ERR, which is sufficient to indicate the phase offset introduced during the transmission progress, to the digital signal DOUT. The digital to time converter 144 then determines a delay time for the reference signal REF1 according to the digital signal DOUT, and accordingly generates the reference signal REF2. Thus, the phase-locked loop 146 is able to generate the oscillating signal LO1, which is utilized for demodulating the modulated signal Y(T), according to the reference signal REF2. Effectively, the oscillating signal LO1 is able to be synchronized with the carrier signal for the modulated signal Y(T). As a result, the output signals I(T) and Q(T) are correctly received.

In some embodiments, the analog to digital converter 142 and the digital to time converter 144 operate as a digital control circuit of the oscillating signal generator 140. Compared with some approaches using a passive filter to control a voltage-controlled oscillator, variations on the digital control circuit in the device 100 are limited. Moreover, the analog to digital converter 142, the digital to time converter 144, and the phase-locked loop 146 together operate as a digital calibration mechanism for the oscillating signal LO1, i.e., the carrier signal of the modulated signal Y(T). In some embodiments, the digital calibration mechanism is implemented with various types of active circuits. Compared with the aforementioned approaches using the passive filter, a circuit area of the device 100 is reduced.

Figure 2:
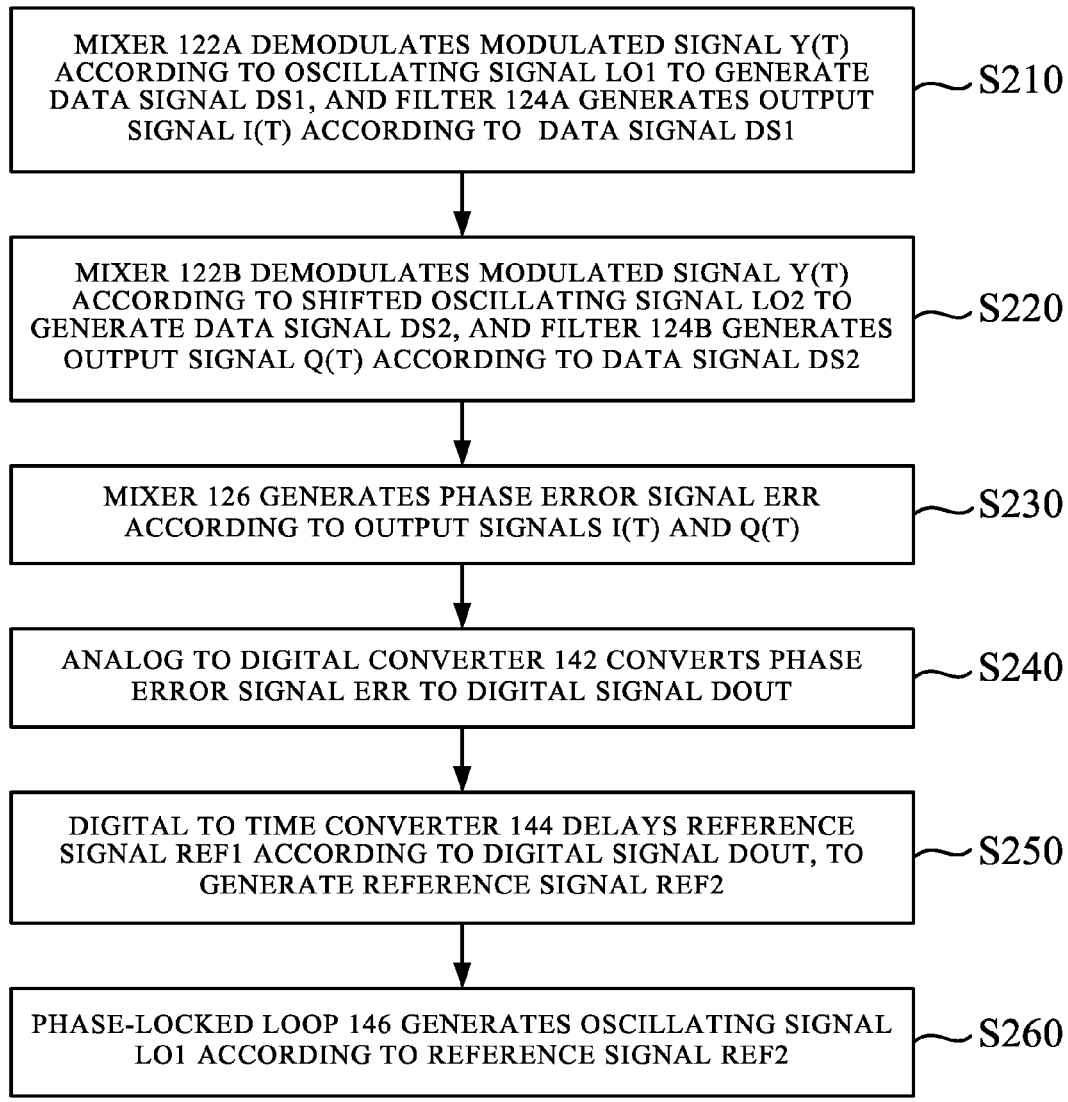
FIG. 2 is a flow chart of a method illustrating operations of the device in FIG. 1 in accordance with various embodiments of the present disclosure.

FIG. 2 is a flow chart of a method 200 illustrating operations of the device 100 in FIG. 1, in accordance with some embodiments of the present disclosure. The operations of the device 100 in FIG. 1 are also described below by the method 200 illustrated in FIG. 2. For better understanding of the present disclosure, the method 200 is discussed in relation to the device 100 shown in FIG. 1, but is not limited thereto.

As illustratively shown in FIG. 2, the method 200 includes operation S210, S220, S230, S240, S250 and S260. In operation S210, the mixer 122A demodulates the modulated signal Y(T) according to the oscillating signal LO1 to generate the data signal DS1, and the filter 124A generates the output signal I(T) according to the data signal DS1. In operation S220, the mixer 122B demodulates the modulated signal Y(T) according to the shifted oscillating signal LO2 to generates the data signal DS2, and the filter 124B generates the output signal Q(T) according to the data signal DS2, in which the shifted oscillating signal LO2 is generated by the phase shifter 128 according to the oscillating signal LO1. In operation S230, the mixer 126 generates the phase error signal ERR according to the output signal I(T) and the output signal Q(T). In operation S240, the analog to digital converter 142 converts the phase error signal ERR to the digital signal DOUT. In operation S250, the digital to time converter 144 delays the reference signal REF1 according to the digital signal DOUT, to generate the reference signal REF2. In operation S260, the phase-locked loop 146 generates the oscillating signal LO1 according to the reference signal REF2. After operation S260 is performed, in a steady state, the oscillating signal LO1 is effectively calibrated. Thus, the mixer 122A and the mixer 122B are able to demodulate the modulated signal Y(T) according to the calibrated oscillating signal LO1. As a result, the coherent demodulation for the modulated signal Y(T) is permitted.

The above description includes exemplary operations, but the operations are not necessarily performed in the order described. The order of the operations disclosed in the present disclosure are able to be changed, or the operations are able to be executed simultaneously or partially simultaneously as appropriate, in accordance with the spirit and scope of various embodiments of the present disclosure.

Figure 3:
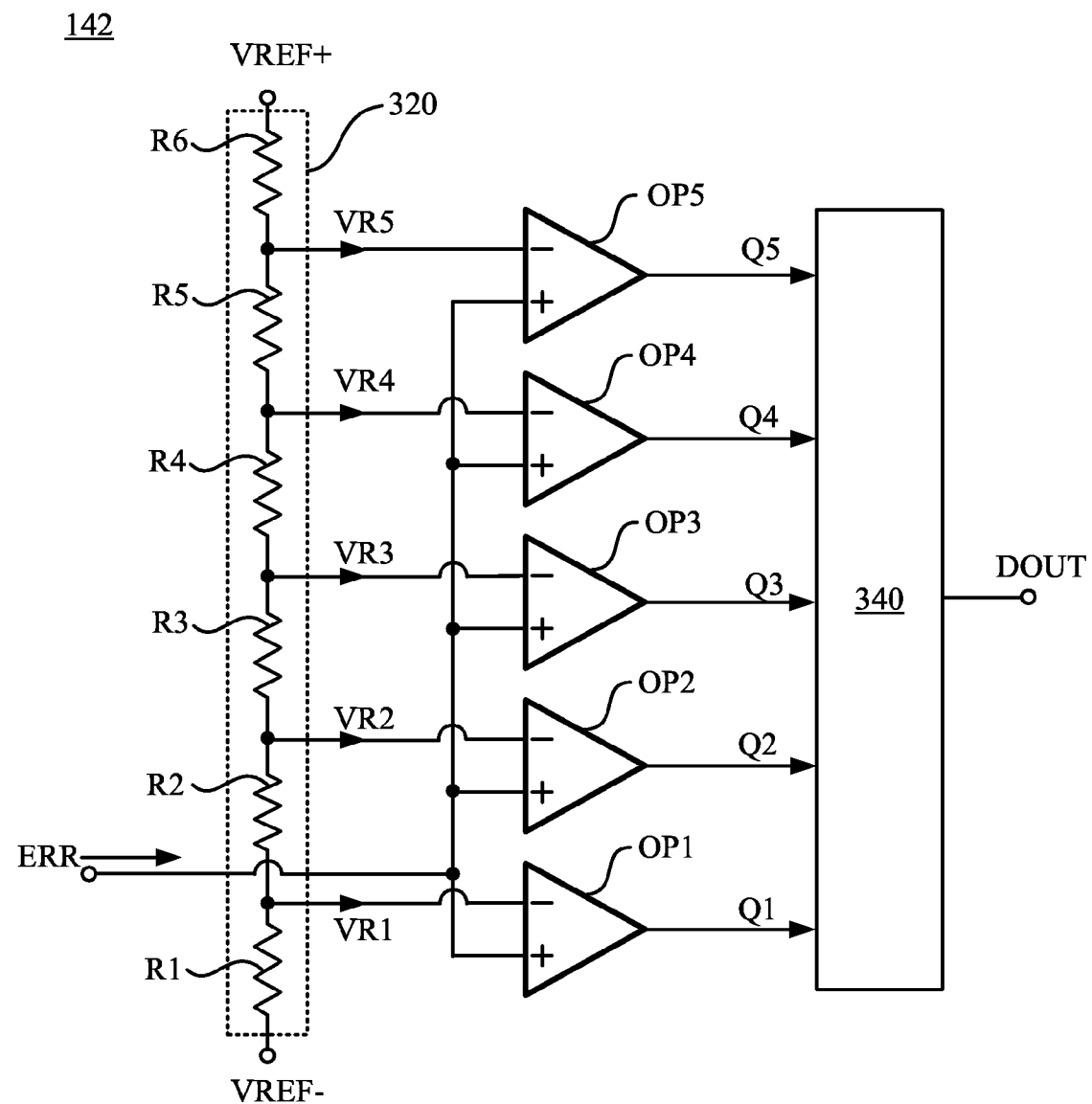
FIG. 3 is a schematic diagram of an analog to digital converter in FIG. 1 in accordance with various embodiments of the present disclosure.

Reference is made to FIG. 3. FIG. 3 is a schematic diagram of the analog to digital converter 142 in FIG. 1, in accordance with various embodiments of the present disclosure. In some embodiments, the analog to digital converter 142 includes a voltage divider 320, comparators OP1-OP5, and an encoder 340.

In some embodiments, the voltage divider 320 is configured to generate at least one reference voltage according to at least one predetermined voltage. For illustration, the voltage divider is configured to generate reference voltages VR1-VR5 according to the predetermined voltages VREF+ and VREF−. As illustratively shown in FIG. 3, in some embodiments the voltage divider 320 includes resistors R1-R6 coupled in series. One end of the series-connected resistors R1-R6 is configured to receive the predetermined voltage VREF+, and another end of the series-connected resistors R1-R6 is configured to receive the predetermined voltage VREF−. With such arrangements, a voltage difference between the reference voltages VREF+ and VREF− is divided by the resistors R1-R6 to generate the reference voltages VR1-VR5.

Furthermore, the comparators OP1-OP5 are coupled to different nodes of the voltage divider 320 to receive reference voltages VR1-VR5 respectively. The comparators OP1-OP5 are configured to compare the phase error signal ERR with the reference voltages VR1-VR5, respectively, to generate bit signals Q1-Q5. Positive input terminals of the comparators OP1-OP5 are configured to receive the phase error signal ERR. Negative input terminals of the comparators OP1-OP5 are electrically coupled to different nodes between two of the resistors R1-R6, respectively. With such arrangements, the bit signals Q1-Q5 are able to present the voltage level of the phase error signal ERR in a digital form. For example, if the voltage level of the phase error signal ERR is between the reference voltages VR3 and VR4, the bit signals Q4 and Q5 are logic zero which indicates logic low level. Alternatively stated, as the reference voltages VR4 and VR5 are higher than the phase error signal ERR, the compactors OP4 and OP5 accordingly output the bit signals Q4 and Q5 being logic zero. On the other hand, as the reference voltages VR1-VR3 are lower than the voltage level of the phase error signal ERR, the bit signals Q1-Q3 are logic one which indicates logic high level.

In some embodiments, the bit signals Q1-Q5 are $2^{N-1}$-bit thermometer codes, and are able to be converted to N-bit binary codes, in which N is an integer. As illustratively shown in FIG. 3, the encoder 340 is coupled to the output terminals of the comparators OP1-OP5 to receive the bit signals Q1-Q5. The encoder 340 then converts the bit signals Q1-Q5 to the digital signal DOUT. In some embodiments, the encoder 340 is a thermometer to binary encoder, and configured to output the digital signal DOUT with N-bit binary codes.

The arrangement of the analog to digital converter 142 in FIG. 3 is given for illustrative purposes. Various arrangements of the analog to digital converter 142 are within the contemplated scope of the present disclosure.

Figure 4A:
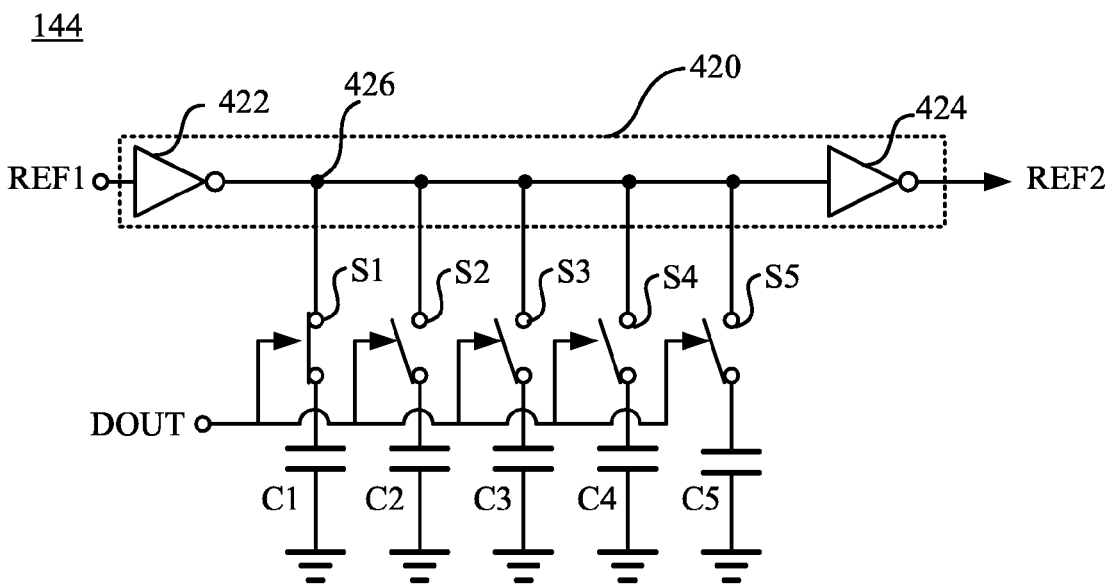
FIG. 4A is a schematic diagram of a digital to time converter in FIG. 1 in accordance with various embodiments of the present disclosure.

Reference is made to FIG. 4A. FIG. 4A is a schematic diagram of a digital to time converter 144 in FIG. 1, in accordance with various embodiments of the present disclosure.

In some embodiment, as illustratively shown in FIG. 4A, the digital to time converter 142 includes an inverter chain 420, capacitive units C1-C5, and switching units S1-S5. The inverter chain 420 is configured to generate the reference signal REF2 according to the reference signal REF1. The switching units S1-S5 are configured to be turned on or off according to the digital signal DOUT, in order to connect or disconnect the corresponding capacitive units C1-C5 to the inverter chain 420.

In some embodiments, the inverter chain 420 includes inverter units 422 and 424. An input terminal of the inverter unit 422 is configured to receive the reference signal REF1. An input terminal of the inverter unit 424 is coupled to an output terminal of the inverter unit 422 at a node 426, and an output terminal of the inverter unit 424 is configured to output the reference signal REF2. In some embodiments, the switching units S1-S5 are configured to be turned on or off according to a corresponding bit of the digital signal DOUT. For illustration, the switching unit S1 is turned on or off by a first bit of the digital signal DOUT, the switching unit S2 is turned on or off by a second bit of the digital signal DOUT, and so on. Alternatively stated, for the digital signal DOUT with N-bits, the X-th bit of the digital signal DOUT is configured to turn the X-th switching unit of N switching units on or off.

As illustratively shown in FIG. 4A, the capacitive units C1-C5 are coupled to the node 426 via the switching units S1-S5, and are coupled in parallel with each other. Effectively, the output loading of the inverter unit 422 is varied with the connections of the switching units S1-S5. The delay time between the reference signal REF1 and the reference signal REF2 are varied with the output loading of the inverter unit 422. In other words, the delay time is able to be determined by controlling the switching units S1-S5. The switching units S1-S5 and the capacitive units C1-C5 form an equivalent RC circuit, and the equivalent capacitance is determined according to the capacitive units C1-C5 connected to the node 426. For illustration, if the first bit of the digital signal DOUT is logic one, and the second bit to the fifth bit of the digital signal DOUT are logic zero, the switching unit S1 is turned on, and the switching units S2-S5 are thus turned off. As a result, the capacitive unit C1 is connected to the node 426 via the switching unit S1, and the capacitive units C2-C5 are disconnected to the node 426. Thus, the output loading of the inverter 422 is adjusted, and the delay time is accordingly varied.

Figure 4B:
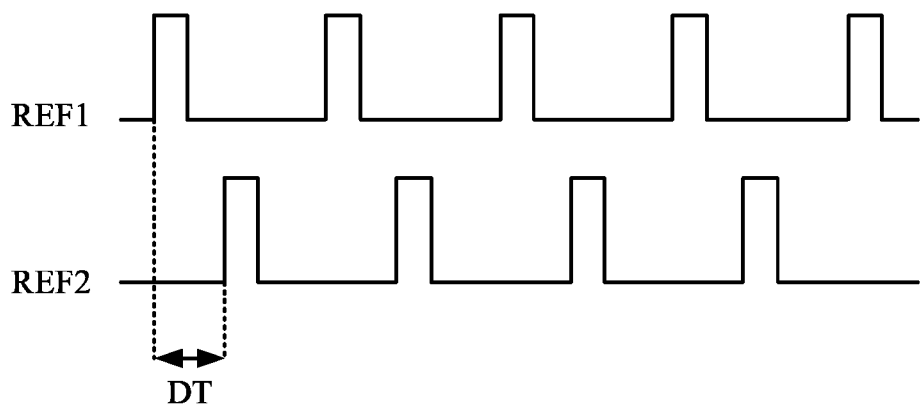
FIG. 4B is a waveform illustrating the first reference signal and the second reference signal in FIG. 4A in accordance with various embodiments of the present disclosure.

Reference is made to FIG. 4B. FIG. 4B is a waveform illustrating the reference signal REF1 and the reference signal REF2 in FIG. 4A in accordance with various embodiments of the present disclosure. As illustratively shown in FIG. 4B, a controllable and variable phase is present between the reference signal REF2 and the reference signal REF1. Alternatively stated, the delay time DT between the reference signal REF1 and the reference signal REF2 is able to be adjusted according to the digital signal DOUT. In some embodiments, the capacitive units C1-C5 are configured to have the same capacitance value. Alternatively, in some other embodiments, the capacitive units C1-C5 are configured to have different capacitance values. For different applications, the capacitance values of the capacitive units C1-C5 are properly adjusted according to practical needs.

As described above, based on the analog to digital converter 142 in FIG. 3 and the digital to time converter 144 in FIG. 4A, the phase of the reference signal REF2 are adjusted, via the digital signal DOUT, according to different voltage levels of the phase error signal ERR.

The arrangement of the digital to time converter 144 in FIG. 4A is given for illustrative purposes. Various arrangements of the digital to time converter 144 are within the contemplated scope of the present disclosure. Furthermore, various proper electrical components are chosen to implement the functional units in the aforementioned embodiments. For example, in some embodiments, the switching units and the capacitive units are implemented with various types of transistors or other semiconductor components, and the comparators are implemented with operational amplifiers.

Figure 5:
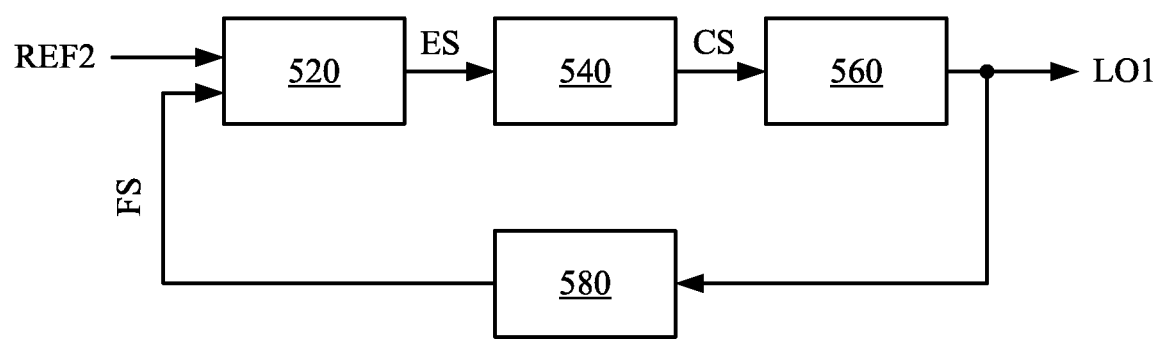
FIG. 5 is a schematic diagram of a phase-locked loop circuit in FIG. 1 in accordance with various embodiments of the present disclosure.

Reference is made to FIG. 5. FIG. 5 is a schematic diagram of a phase-locked loop 146 in FIG. 1, in accordance with various embodiments of the present disclosure. As mentioned in the above paragraphs, the phase-locked loop 146 is configured to generate the oscillating signal LO1 according to the reference signal REF2. Since the phase of the reference signal REF2 is adjusted according to the phase error signal ERR, and the reference signal REF2 is configured as the reference clock signal to generate the oscillating signal LO1, the phase of the oscillating signal LO1 generated by the phase-locked loop 146 is thus controlled by the phase error signal ERR.

In some embodiments, the phase-locked loop 146 includes a phase detecting unit 520, a filter unit 540, an oscillator unit 560, and a frequency divider unit 580. The phase detecting unit 520 is configured to output an error signal ES according to the reference signal REF2 and a feedback signal FS sent from the frequency divider unit 580. The filter unit 540 includes a low-pass filter coupled to the phase detecting unit 520 and configured to filter the error signal ES and output a control signal CS. Then, the control signal CS is sent to the oscillator unit 560, such that the oscillator unit 560 outputs the oscillating signal LO1 according to the control signal CS. The frequency divider unit 580 is arranged in the feedback path and coupled between the oscillator unit 560 and the phase detecting unit 520.

In some embodiments, the frequency divider unit 580 is configured to divide the frequency of the oscillating signal LO1 by N and output the feedback signal FS to the phase detecting unit 520. Alternatively stated, the frequency of the oscillating signal LO1 is N times of the frequency of the reference signal REF2. In some embodiments, in a steady state, when the phase of the reference signal REF2 is $\varphi$, the phase of the oscillating signal LO1 is N$\varphi$. In some embodiments, N is an integer number.

The arrangement of the phase-locked loop 146 illustrated in FIG. 5 is given for illustrative purposes. Various arrangements of the phase-locked loop 146 are within the contemplated scope of the present disclosure. For example, in various embodiments, the phase-locked loop 146 further includes a reference input divider unit (not shown) configured to multiply the frequency of the reference signal REF2 by a fractional number N/M.

Figure 6:
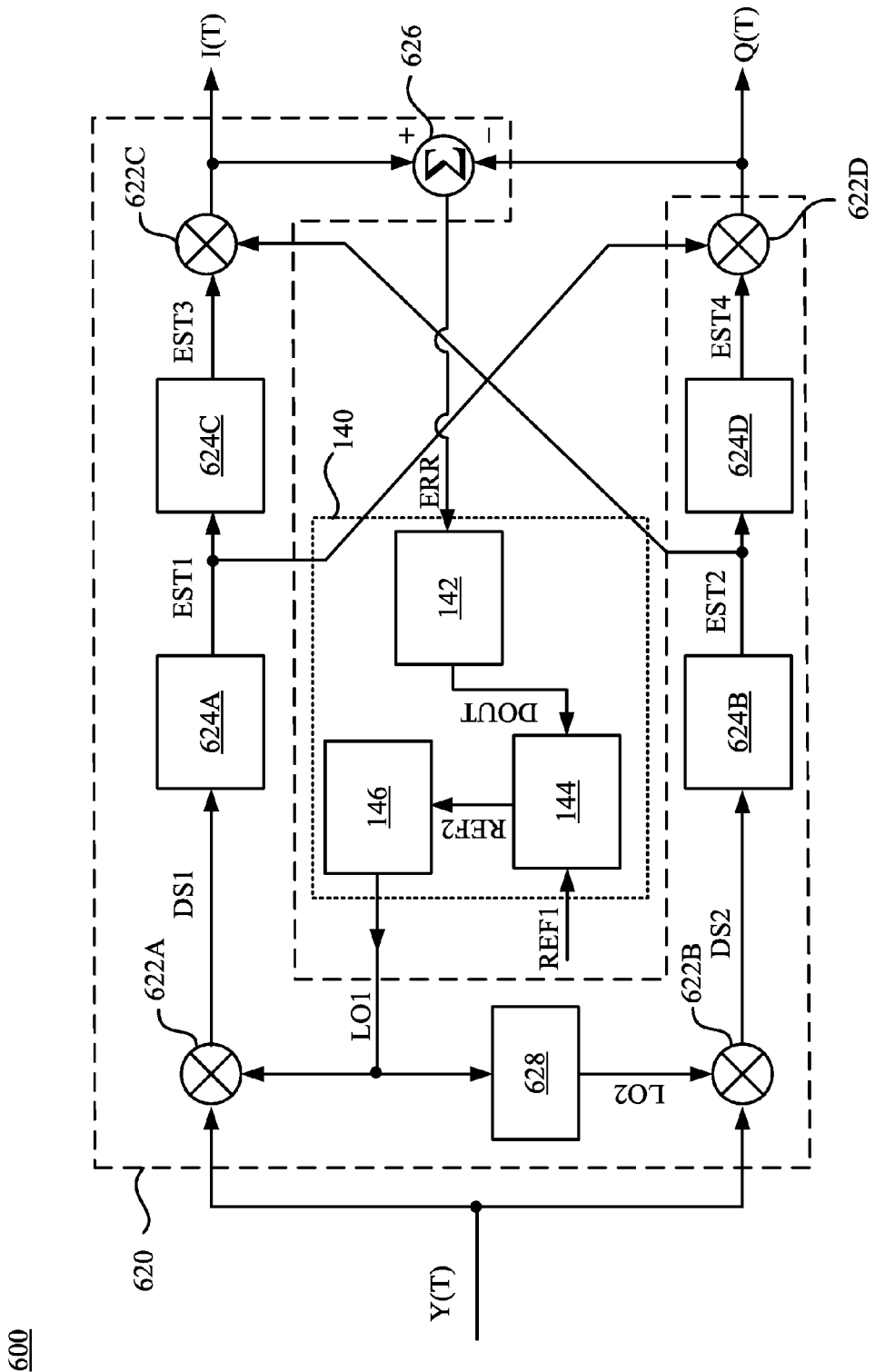
FIG. 6 is a schematic diagram of a device in accordance with various embodiments of the present disclosure.

Reference is now made to FIG. 6. FIG. 6 is a schematic diagram of a device 600 in accordance with various embodiments of the present disclosure. With respect to the embodiments of FIG. 1, like elements in FIG. 6 are designated with the same reference numbers for ease of understanding.

In some embodiments, the device 600 illustrated in FIG. 6 is applied to transceivers employing Quadrature Phase Shift Keying (QPSK) modulation or Quadrature Amplitude Modulation (QAM).

For illustration, compared with the device 100, the data receiving circuit 620 of the device 600 includes mixers 622A-622D, filters 624A and 624B, limiters 624C and 624D, a subtractor 626, and a phase shifter 628. The filter 624A is electrically coupled to the mixer 622A.

A first input terminal of the mixer 622A and a first input terminal of the mixer 622B are configured to receive the modulated signal Y(T). A second input terminal of the mixer 622A is electrically coupled to the output terminal of the phase-locked loop 146 to receive the oscillating signal LO1. A second input terminal of the mixer 622B is electrically coupled to an output terminal of the phase shifter 628 to receive a shifted oscillating signal LO2. An input terminal of the filter 624A is electrically coupled to an output terminal of the mixer 622A to receive the data signal DS1. An input terminal of the filter 624B is electrically coupled to an output terminal of the mixer 622B to receive the data signal DS2. An input terminal of the limiter 624C is electrically coupled to an output terminal of the filter 624A to receive estimated data EST1. An input terminal of the limiter 624D is electrically coupled to an output terminal of the filter 624B to receive estimated data EST2. A first input terminal of the mixer 622C is electrically coupled to an output terminal of the limiter 624C to receive estimated data EST3, and a second input terminal of the mixer 622C is electrically coupled to the output terminal of the filter 624B to receive the estimated data EST2. A first input terminal of the mixer 622D is electrically coupled to an output terminal of the limiter 624D to receive estimated data EST4, and a second input terminal of the mixer 622D is electrically coupled to the output terminal of the filter 624A to receive the estimated data EST1.

A first input terminal and a second input terminal of the subtractor 626 are electrically coupled to an output terminal of the mixer 622C and an output terminal of the filter mixer 622D respectively to receive the output signal I(T) and Q(T). An output terminal of the subtractor 626 is electrically coupled to the input terminal of the analog to digital converter 142. An input terminal of the phase shifter 628 is electrically coupled to the output terminal of the phase-locked loop 146 to receive the oscillating signal LO1.

In some embodiments for transceivers employing QPSK or QAM modulations, the limiter 624C is configured to produce the estimated data EST3 to indicate the sign of the estimated data EST1, and the limiter 624D is configured to produce the estimated data EST4 to indicate the sign of the estimated data EST2. The estimated data EST3 and the estimated data EST4 are then mixed with the estimated data EST2 and the estimated data EST1, respectively.

Compared with the device 100, the device 600 includes the subtractor 626, instead of the mixer 126. In some embodiments, the subtractor 626 is configured to subtract the output signal Q(T) from the output signal I(T) to generate the phase error signal ERR.

Figure 7:
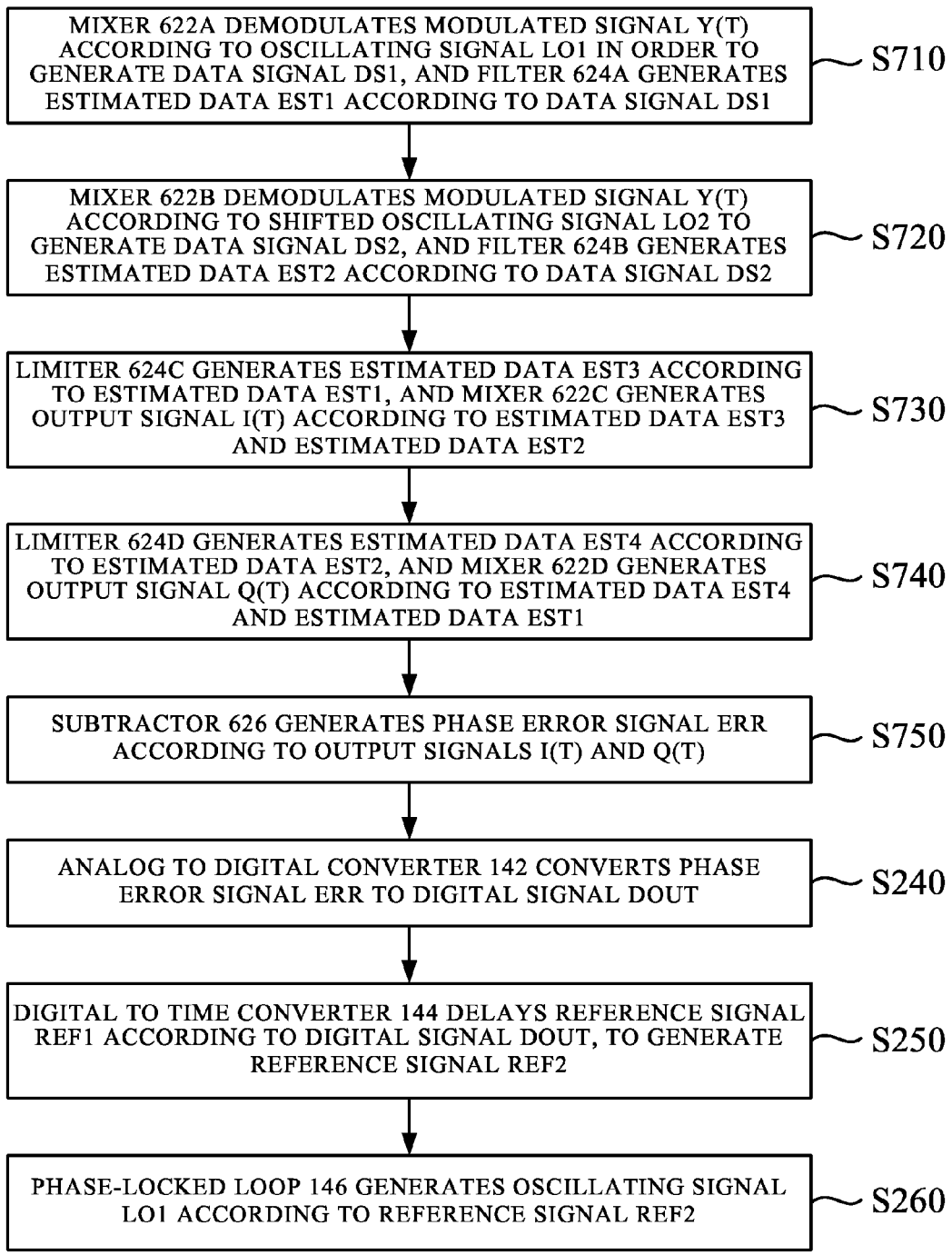
FIG. 7 is a flow chart of a method illustrating operations of the device in FIG. 6 in accordance with various embodiments of the present disclosure.

FIG. 7 is a flow chart of a method 700 illustrating operations of the device 600 in FIG. 6, in accordance with some embodiments of the present disclosure. The operations of the device 600 in FIG. 6 are also described below by the method 700 illustrated in FIG. 7. For better understanding of the present disclosure, the method 700 is discussed in relation to the device 600 shown in FIG. 6, but is not limited thereto. With respect to the embodiments of FIG. 2, like elements in FIG. 7 are designated with the same reference numbers for ease of understanding.

As illustratively shown in FIG. 7, the method 700 includes operation S710, S720, S730, S740, S750, S240, S250 and S260. Compared with the method 200 illustrated in FIG. 2, in some embodiments illustrated in FIGS. 6-7, the operations of generating the phase error signal ERR in FIG.

6, i.e., operations S710-S750, are different from the operations S210-S230 illustrated in FIG. 2.

In operation S710, the mixer 622A demodulates the modulated signal Y(T) according to the oscillating signal LO1 in order to generate the data signal DS1, and the filter 624A generates the estimated data EST1 according to the data signal DS1. In operation S720, the mixer 622B demodulates the modulated signal Y(T) according to the shifted oscillating signal LO2 to generate the data signal DS2, and the filter 624B generates the estimated data EST2 according to the data signal DS2, in which the shifted oscillating signal LO2 is generated by the phase shifter 628 according to the oscillating signal LO1.

In operation S730, the limiter 624C generates the estimated data EST3 according to the estimated data EST1, and the mixer 622C generates the output signal I(T) according to the estimated data EST3 and the estimated data EST2. In operation S740, the limiter 624D generates the estimated data EST4 according to the estimated data EST2, and the mixer 622D generates the output signal Q(T) according to the estimated data EST4 and the estimated data EST1.

In operation S750, the subtractor 626 generates the phase error signal ERR according to the output signal I(T) and the output signal Q(T).

In some embodiments, the subtractor 626 operates as the phase detector of device 600 in FIG. 6. For illustration, in operations S710-S750, the subtractor 626 subtracts the output signal Q(T) from the output signal I(T) to generate the phase error signal ERR. Effectively, the phase error signal ERR indicates a difference between the oscillating signal LO1 and the modulated signal Y(T). After operation S750 is performed, the phase error signal ERR is then send to the oscillating signal generator 140, in order to perform operations S240-S260 as discussed above. After operation S260 is performed, in a steady state, the oscillating signal LO1 is effectively calibrated. Thus, the data receiving circuit 120 is able to demodulate the modulated signal Y(T) according to the calibrated oscillating signal LO1. As a result, the coherent demodulation for the modulated signal Y(T) is permitted.

The above description includes exemplary operations, but the operations are not necessarily performed in the order described. The order of the operations disclosed in the present disclosure are able to be changed, or the operations are able to be executed simultaneously or partially simultaneously as appropriate, in accordance with the spirit and scope of various embodiments of the present disclosure.

As described above, in the embodiments disclosed in the present disclosure, the phase of the reference signal sent to the phase-locked loop and the oscillator unit is tunable by a delay time controlled by the digital signal, such that the frequency and the phase of the local oscillation signal is adjusted by the loop circuit and therefore the modulated signal is properly demodulated according to the local oscillation signal. The carrier recovery method is applied in communication modulation systems employing various modulations including, for example, BPSK, QPSK, or QAM modulations as discussed in the aforementioned embodiments.

In some embodiments, a device is disclosed that includes a data receiving circuit and an oscillating signal generator. The data receiving circuit is configured to output a first output signal, a second output signal, and a phase error signal according to an oscillating signal and a modulated signal. The phase error signal indicates a phase difference between the oscillating signal and the modulated signal. The oscillating signal generator is configured to delay a phase of a first reference signal according to the phase error signal, to generate the oscillating signal.

Also disclosed is a circuit that includes a demodulator, an analog to digital converter, a digital to time converter, and a phase-locked loop. The demodulator is configured to demodulate a modulated signal according to an oscillating signal. The analog to digital converter is configured to generate a digital signal according to a phase error signal corresponding to the modulated signal. The digital to time converter is configured to generate a second reference signal according to a first reference signal and the digital signal. The phase-locked loop is configured to generate the oscillating signal according to the second reference signal.

Also disclosed is a method that includes the following operations: generating a phase error signal, by a phase detector, according to a first output signal and a second output signal; delaying a first reference signal, by a digital to time converter, according to the phase error signal to generate a second reference signal; and demodulating the modulated signal according to an oscillating signal to output the first output signal and the second output signal, in which the oscillating signal is generated according to the second reference signal.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device comprising:
    a data receiving circuit configured to output a first output signal, a second output signal, and a phase error signal according to an oscillating signal and a modulated signal, wherein the phase error signal indicates a phase difference between the oscillating signal and the modulated signal; and
    an oscillating signal generator configured to delay a phase of a first reference signal according to a digital signal corresponding to the phase error signal, to generate the oscillating signal,
    wherein the oscillating signal generator comprises:
        an analog to digital converter configured to convert the phase error signal to the digital signal; and
        a digital to time converter configured to delay the first reference signal according to the digital signal, to generate a second reference signal.

2. The device of claim 1, wherein the analog to digital converter comprises:
    a voltage divider configured to generate a plurality of reference voltages according to at least one predetermined voltage;
    a plurality of comparators configured to compare the phase error signal with the reference voltages, respectively, to generate a plurality of bit signals; and
    an encoder configured to generate the digital signal according to the bit signals.

3. The device of claim 1, wherein the digital to time converter comprises:

an inverter chain configured to generate the second reference signal according to the first reference signal;
a plurality of capacitive units; and
a plurality of switching units configured to be turned on according to the digital signal, to connect corresponding capacitive units of the plurality of capacitive units to the inverter chain.

4. The device of claim 1, wherein the oscillating signal generator comprises:
a phase-locked loop configured to generate the oscillating signal according to the second reference signal.

5. The device of claim 1, wherein the data receiving circuit comprises:
a first mixer configured to demodulate the modulated signal according to the oscillating signal, to generate a first data signal;
a first filter configured to generate the first output signal according to the first data signal;
a second mixer configured to demodulate the modulated signal according to a shifted oscillating signal, to generate a second data signal;
a second filter configured to generate the second output signal according to the second data signal;
a phase shifter configured to generate the shifted oscillating signal according to the oscillating signal, wherein the oscillating signal and the shifted oscillating signal are different in phase by about 90 degrees; and
a third mixer configured to generate the phase error signal according to the first output signal and the second output signal.

6. The device of claim 1, wherein the data receiving circuit further comprises:
a subtractor configured to subtract the second output signal from the first output signal to generate the phase error signal;
a first mixer configured to demodulate the modulated signal according to the oscillating signal, to generate a first data signal;
a second mixer configured to demodulate the modulated signal according to a shifted oscillating signal, to generate a second data signal;
a phase shifter configured to generate the shifted oscillating signal according to the oscillating signal, wherein the oscillating signal and the shifted oscillating signal are different in phase by about 90 degrees;
a first filter configured to generate first estimated data according to the first data signal;
a second filter configured to generate second estimated data according to the second data signal;
a first limiter configured to generate third estimated data according to the first estimated data;
a second limiter configured to generate fourth estimated data according to the second estimated data;
a third mixer configured to generate the first output signal according to the third estimated data and the second estimated data; and
a fourth mixer configured to generate the second output signal according to the fourth estimated data and the first estimated data.

7. The device of claim 1, wherein the data receiving circuit comprises:
a first mixer configured to demodulate the modulated signal according to the oscillating signal, to generate a first data signal;
a second mixer configured to demodulate the modulated signal according to a shifted oscillating signal, to generate a second data signal; and
a phase shifter configured to generate the shifted oscillating signal according to the oscillating signal, wherein the oscillating signal and the shifted oscillating signal are different in phase by about 90 degrees, and
wherein the oscillating signal generator comprises:
a phase-locked loop configured to generate the oscillating signal according to the second reference signal.

8. The device of claim 7, wherein the data receiving circuit further comprises:
a first filter configured to generate the first output signal according to the first data signal;
a second filter configured to generate the second output signal according to the second data signal; and
a third mixer configured to generate the phase error signal according to the first output signal and the second output signal.

9. The device of claim 7, wherein the data receiving circuit further comprises:
a subtractor configured to subtract the second output signal from the first output signal to generate the phase error signal;
a first filter configured to generate first estimated data according to the first data signal;
a second filter configured to generate second estimated data according to the second data signal;
a first limiter configured to generate third estimated data according to the first estimated data;
a second limiter configured to generate fourth estimated data according to the second estimated data;
a third mixer configured to generate the first output signal according to the third estimated data and the second estimated data; and
a fourth mixer configured to generate the second output signal according to the fourth estimated data and the first estimated data.

10. A device comprising:
a demodulator configured to demodulate a modulated signal according to an oscillating signal;
an analog to digital converter configured to generate a digital signal according to a phase error signal corresponding to the modulated signal;
a digital to time converter configured to generate a second reference signal according to a first reference signal and the digital signal; and
a phase-locked loop configured to generate the oscillating signal according to the second reference signal.

11. The device of claim 10, wherein the demodulator comprises:
a first mixer configured to demodulate the modulated signal according to the oscillating signal, to generate a first data signal;
a second mixer configured to demodulate the modulated signal according to a shifted oscillating signal, to generate a second data signal; and
a phase shifter configured to generate the shifted oscillating signal according to the oscillating signal, wherein the oscillating signal and the shifted oscillating signal are different in phase by about 90 degrees.

12. The device of claim 11, further comprising:
a first filter configured to generate a first output signal according to the first data signal;
a second filter configured to generate a second output signal according to the second data signal; and
a third mixer configured to generate the phase error signal according to the first output signal and the second output signal.

13. The device of claim 11, further comprising:
a subtractor configured to subtract a second output signal from a first output signal to generate the phase error signal;
a first filter configured to generate first estimated data according to the first data signal;
a second filter configured to generate second estimated data according to the second data signal;
a first limiter configured to generate third estimated data according to the first estimated data;
a second limiter configured to generate fourth estimated data according to the second estimated data;
a third mixer configured to generate the first output signal according to the third estimated data and the second estimated data; and
a fourth mixer configured to generate the second output signal according to the fourth estimated data and the first estimated data.

14. The device of claim 11, wherein the analog to digital converter comprises:
a voltage divider configured to generate a plurality of reference voltages according to at least one predetermined voltage;
a plurality of comparators configured to compare the phase error signal with the reference voltages, respectively, to generate a plurality of bit signals; and
an encoder configured to generate the digital signal according to the bit signals.

15. The device of claim 11, wherein the digital to time converter comprises:
an inverter chain configured to generate the second reference signal according to the first reference signal;
a plurality of capacitive units; and
a plurality of switching units configured to be turned on according to the digital signal, to connect corresponding capacitive units of the plurality of capacitive units to the inverter chain.

16. A method comprising:
generating a phase error signal, by a phase detector, according to a first output signal and a second output signal;
converting the phase error signal to a digital signal by an analog to digital converter;
delaying a first reference signal, by a digital to time converter, according to the digital signal corresponding to the phase error signal to generate a second reference signal; and
demodulating a modulated signal according to an oscillating signal to output the first output signal and the second output signal, wherein the oscillating signal is generated according to the second reference signal.

17. The method of claim 16, wherein converting the phase error signal comprising:
generating a plurality of reference voltages, by a voltage divider, according to at least one predetermined voltage;
comparing the phase error signal with the reference voltages, by a plurality of comparators respectively, to generate a plurality of bit signals; and
generating the digital signal according to the bit signals by an encoder.

18. The method of claim 16, wherein delaying the first reference signal comprising:
turning on a plurality of switching units respectively according to the digital signal, to connect a plurality of capacitive units to an inverter chain respectively; and
generating the second reference signal according to the first reference signal by the inverter chain.

19. The method of claim 16, further comprising:
demodulating the modulated signal, by a first mixer, according to the oscillating signal to generate a first data signal;
generating a shifted oscillating signal, by a phase shifter, according to the oscillating signal, wherein the oscillating signal and the shifted oscillating signal are different in phase by about 90 degrees;
demodulating the modulated signal, by a second mixer, according to the shifted oscillating signal, to generate a second data signal;
generating the first output signal, by a first filter, according to the first data signal;
generating the second output signal, by a second filter, according to the second data signal; and
generating the phase error signal, by a third mixer, according to the first output signal and the second output signal.

20. The method of claim 16, further comprising:
subtracting the second output signal from the first output signal, by a subtractor, to generate the phase error signal;
generating first estimated data, by a first filter, according to a first data signal;
generating second estimated data, by a second filter, according to a second data signal;
generating third estimated data, by a first limiter, according to the first estimated data;
generating fourth estimated data, by a second limiter, according to the second estimated data;
generating the first output signal, by a third mixer, according to the third estimated data and the second estimated data; and
generating the second output signal, by a fourth mixer, according to the fourth estimated data and the first estimated data.

* * * * *